(12) United States Patent
Kazumi (10) Patent No.: US 6,968,501 B2
(45) Date of Patent: Nov. 22, 2005

(54) DOCUMENT FORMAT IDENTIFICATION APPARATUS AND METHOD

(75) Inventor: Kenichi Kazumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 581 days.

(21) Appl. No.: 09/984,119

(22) Filed: Oct. 29, 2001

(65) Prior Publication Data

US 2002/0052892 A1 May 2, 2002

(30) Foreign Application Priority Data

Oct. 31, 2000 (JP) .......................................... 2000-332890
Oct. 19, 2001 (JP) .......................................... 2001-322585

(51) Int. Cl.[7] .............................................. G06F 17/24
(52) U.S. Cl. ....................... 715/517; 382/195; 382/218; 382/219
(58) Field of Search ................................ 382/195, 518, 382/519; 715/517, 524

(56) References Cited

U.S. PATENT DOCUMENTS

| | | | |
|---|---|---|---|
| 5,790,211 A | | 8/1998 | Seachman et al. |
| 5,920,658 A | * | 7/1999 | Yamagata et al. ........... 382/181 |
| 6,181,378 B1 | * | 1/2001 | Horie et al. ................. 348/353 |
| 6,272,245 B1 | * | 8/2001 | Lin ............................ 382/218 |
| 6,665,452 B1 | * | 12/2003 | Takemoto et al. .......... 382/218 |
| 6,735,335 B1 | * | 5/2004 | Liu et al. ..................... 382/218 |
| 6,765,700 B1 | * | 7/2004 | Naito et al. ................. 358/486 |
| 2002/0003909 A1 | * | 1/2002 | Kaneda ....................... 382/295 |
| 2004/0208371 A1 | * | 10/2004 | Liu et al. ..................... 382/173 |

FOREIGN PATENT DOCUMENTS

| | | | |
|---|---|---|---|
| EP | 0618545 A2 | 10/1994 | ............ G06K/9/20 |
| GB | 2287819 A | 9/1995 | ............ G06K/9/36 |

OTHER PUBLICATIONS

Maderlschner G et al: "Classification of documents by form and content" Pattern Recognition Letters, North–Holland Publ. Amsterdam, NL, vol. 18, No. 11–13 pp. 1225–1231, (Nov. 1997).

Anonymous: "white Scanner Drum with Black Strips," IBM Technical Disclosure Bulletin, vol. 33, No. 1B, Jun. 1, 1990, pp. 468–469.

* cited by examiner

Primary Examiner—Heather R. Herndon
Assistant Examiner—Doug Hutton
(74) Attorney, Agent, or Firm—Fitzpatrick, Cella, Harper & Scinto

(57) ABSTRACT

To provide a document format identification apparatus capable of correctly identifying a document format even in an environment where a number of types of scanners are used. The document format identification apparatus includes: an extraction unit for extracting a feature for a document the format of which to be identified; a generation unit for generating, based on the feature extracted by the extraction unit, document format data containing identification data for identifying a document format and correction information for correcting a feature difference produced by a difference in type of the image input apparatus; and an identification unit, for correcting document format data stored in a storage unit and document format data generated by the generation unit based on the correction information and for identifying a document format of a document to be identified by comparing the corrected document format data.

16 Claims, 6 Drawing Sheets

| FORM TO BE IDENTIFIED / REGISTERED FORM | WHITE BACK | BLACK BACK |
|---|---|---|
| WHITE BACK | PERFORM REGULAR SIMILARITY CALCULATION | TRANSFORM COORDINATES OF FORMAT OF FORM TO BE SEARCHED FOR BEFORE SIMILARITY CALCULATION |
| BLACK BACK | TRANSFORM COORDINATES OF FORMAT OF FORM TO BE SEARCHED FOR BEFORE SIMILARITY CALCULATION | PERFORM REGULAR SIMILARITY CALCULATION |

FIG. 5

DOCUMENT FORMAT IDENTIFICATION APPARATUS AND METHOD

FIELD OF THE INVENTION

The present invention relates to an automatic identification of a document format.

BACKGROUND OF THE INVENTION

Figure 2A:
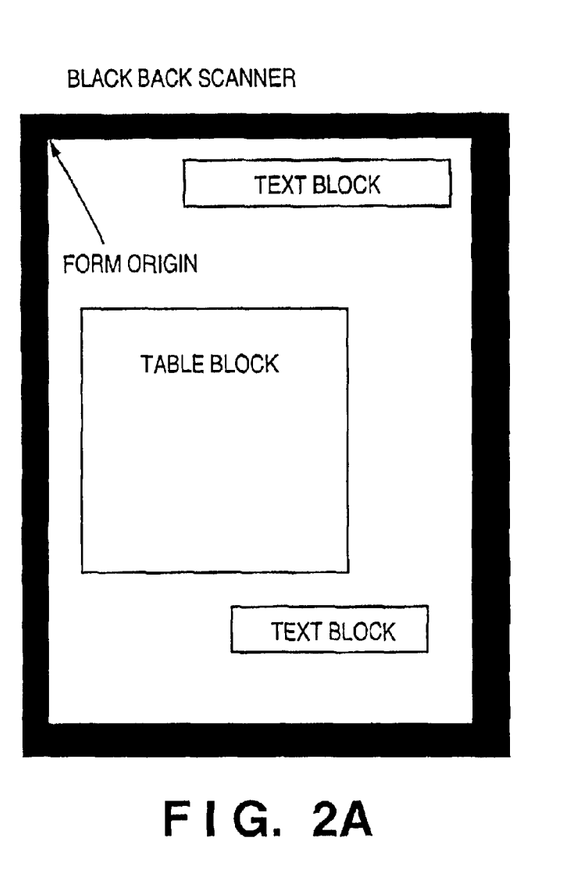
FIGS. 2A and 2B show sample images for illustrating a difference in form origins between a black back scanner and a white back scanner.

In a field where forms in various formats are handled, an apparatus for automatically identifying forms by format has been proposed. This type of automatic identification is made based on the similarity between formats of the forms. A method of determining an origin position of a form greatly affects the result of the calculation of the similarity between form formats. If an upper left corner of an image read through a scanner is used as the origin of a form as is, a displacement of the form placed on the scanner displaces the position of the form origin, preventing the form from being properly recognized. Therefore, form format data is generated in order to correct the form origin position. This method will be described below. When a scanner that reads an image against a black background (hereinafter called a "black back scanner") is used to read an image, the outer rim of a form in the read image appears in black Therefore a process (black rim correction) for deleting the black rim is performed to correctly recognize the shape of the form. Means for generating form format data uses as the origin the upper left corner of the image that has undergone the black rim correction to generate the format data (FIG. 2A).

Figure 2B:
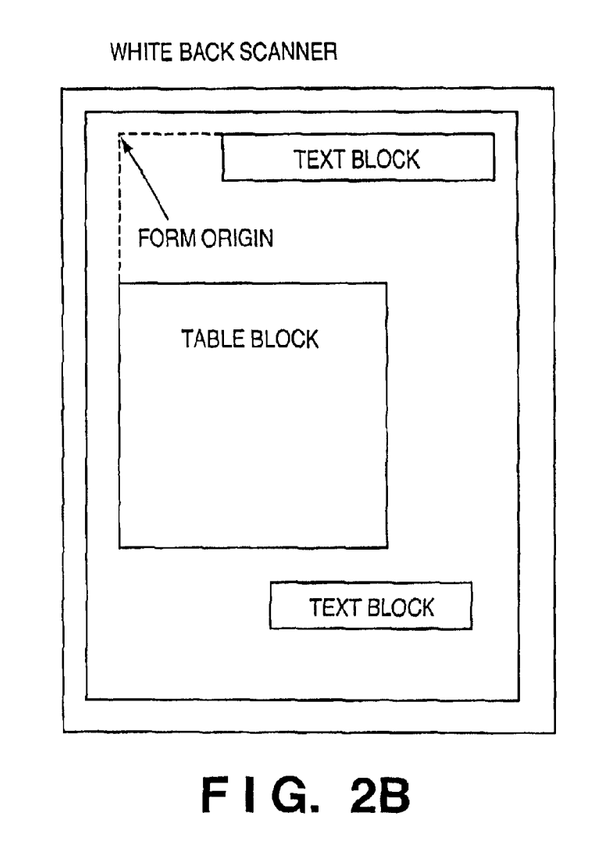

When a scanner that reads an image against a white background (hereinafter called a "white back scanner"), the outer rim of a form in the read image appears in white. Thus the color of the rim in many cases is the same as that of the form itself. Therefore the black rim correction cannot be applied to it. Because no colors appear on the outer rim of the form except white, which is the background color, features of the image are extracted to determine the positions of a table block and a text block to decide its origin. For example, the top, left most position of a rectangle encompassing a whole block is used as the origin to generate the format data. Although the upper left corner of the form cannot be used as the origin in this method, the origin of forms in the same format can be determined uniquely when the background color is white (FIG. 2B).

However, the method of determining the origin in the black back scanner differs from the method used in the white black scanner. Therefore, in an environment where various types of scanners are used, different methods are used to calculate features, preventing document formats from being correctly identified. In addition, an apparatus for identifying document formats is often used in a relatively large client-server-based system environment. When the conventional automatic identification method described above is used in such a system in which a number of clients are used, a single type of scanners must be used in those clients or some other restrictions must be introduced.

SUMMARY OF THE INVENTION

The present invention has been achieved in view of these problems and it is an object of the present invention to correctly identify various document formats in an environment where a plurality of different features introduced by variations in type of image input apparatuses are mixed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of the present invention will be described below with reference to the accompanying drawings.

Figure 1:
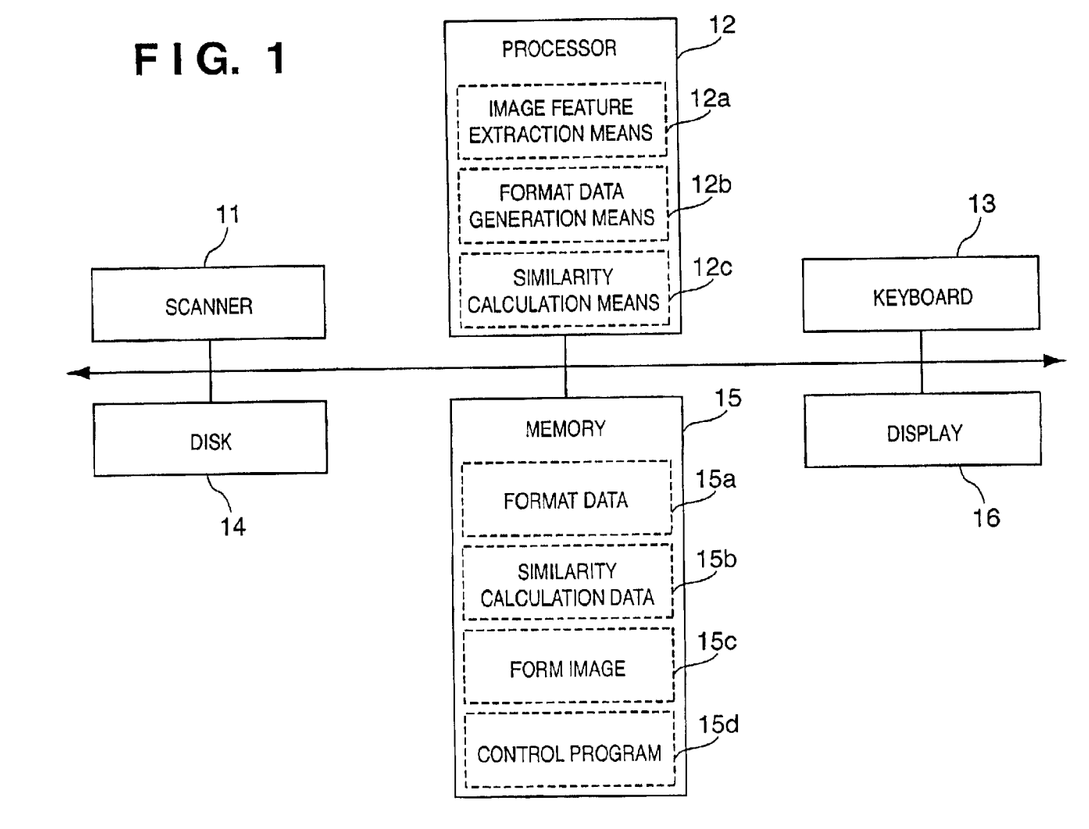
FIG. 1 is a block diagram of a general configuration of a form identification apparatus according to an embodiment of the present invention.

FIG. 1 is a block diagram showing a general configuration of an automatic form identification apparatus according to an embodiment of the present invention.

Reference numeral 11 denotes a scanner for optically reading a form image and outputting form image data. Reference numeral 12 denotes a processor which functions as image feature extraction means 12a, format data generation means 12b, and similarity calculation means 12c by executing a control program 15d stored in memory 15. The image read by the scanner 11 is stored in the memory 15 as a form image 15c. The form image 15c is binarized and sent to the image feature extraction means 12a, where its attributes are classified into blocks such as table, text, and picture blocks by means of procedures such as histogram method of black dot. For the table block, a detailed construction of the table is determined by a method such as ruled-line tracing. The text block is subjected to a process such as character code conversion.

Figure 3:
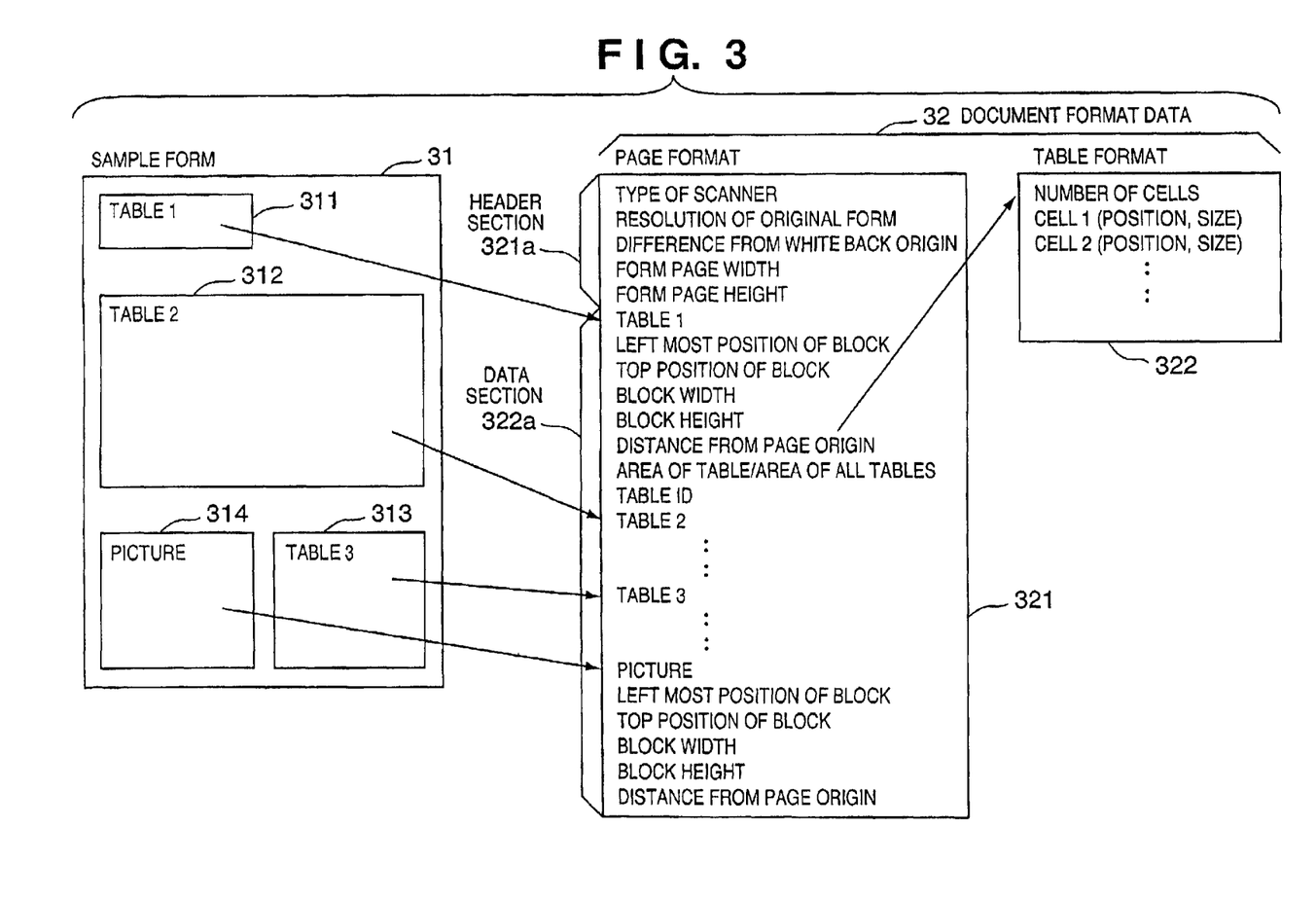
FIG. 3 shows examples of a page format and a table format in format data according to the present invention.

From information obtained in this way, the page format and the table format of the form as shown in FIG. 3 are generated by the format data generation means 12b and stored in the memory 15 and a disk 14. FIG. 3 shows a sample form 31 extracted by the image feature extraction means 12a. Three table blocks (311 through 313) and one picture block (314) are extracted. Format data 32 of the form is stored in layers of the page format 321 and the table format 322. The page format 321 has a header section 321a containing the type of the scanner, the resolution of the original form, a difference from the white back origin, and the page width and page height of the form. Now, the type of the scanner is set dependent on the fact which of the white back scanner and the black back scanner is used, but the type of scanner is preset during the installation of a scanner application. The difference from the white back origin is a distance from the origin (hereinafter called the "black back origin") read by a black back scanner to the origin (hereinafter called the "white back origin") read by a white back scanner. Therefore the difference from the white back origin of a form read by a white back scanner will be always zero.

A data section 322a contains various items of information for each block. For example, if the block attribute is "table," it contains the left most position and top position of the block as position information and the width and height of the block as size information. It also contains a distance from the page origin used for picking up a form to be compared, and the area of the relevant block divided by the area of all the table blocks, which is used for calculating similarity. In addition, it contains a table ID for linking to detailed table information. The table format 322 indicates the detailed construction of cells in the table associated with this table ID. It contains the number of cells in the table, and the position and size of cells.

When a command for registering a form, identifying a form, or other operations is input into the form identification apparatus through a keyboard, the processor 12 performs a process corresponding to the command by using the format data 32 described above. Then the result of identification is displayed on a display 16.

The operation of various control processes performed by the form identification apparatus, in particular the processor 12, according to this embodiment will be described below with reference to FIGS. 3, 4, 5, and 6.

Figure 5:
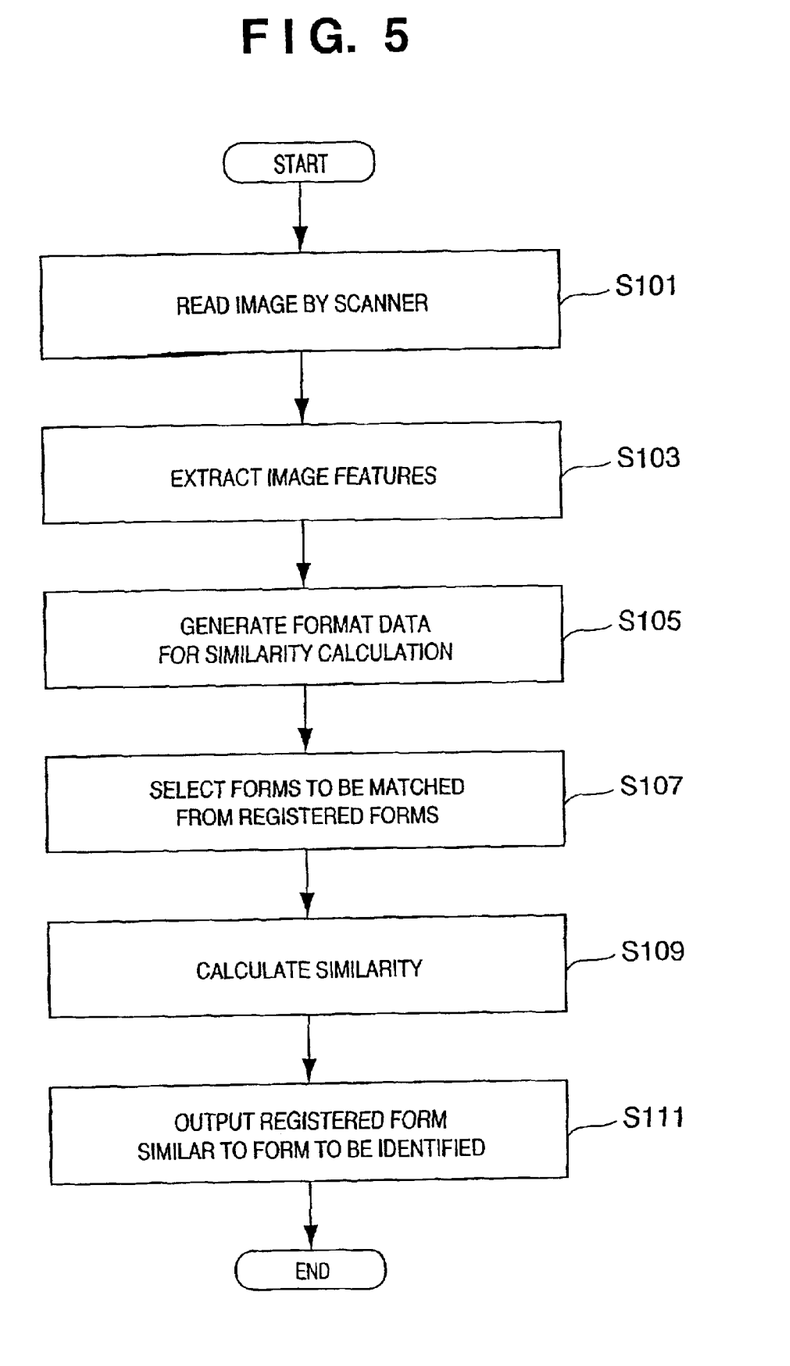
FIG. 5 is a flowchart showing an outline of a process according to the present invention.

FIG. 5 shows a general process flow in the form identification apparatus. At step S101, a form to be identified is read by a scanner. At step S103, feature data such as the coordinates of a table and text block is extracted. At step S105, the feature data is converted into format data for calculating similarity. Forms that can have the same format data as that of the form to be identified are selected from registered forms at step S107 on the basis of this format data. At step S109, similarities of the formats of all the selected forms are calculated. A predetermined number of registered forms having higher similarities calculated are selected as candidates for a form similar to the form to be identified and their identification codes and similarities are output.

Figure 4:
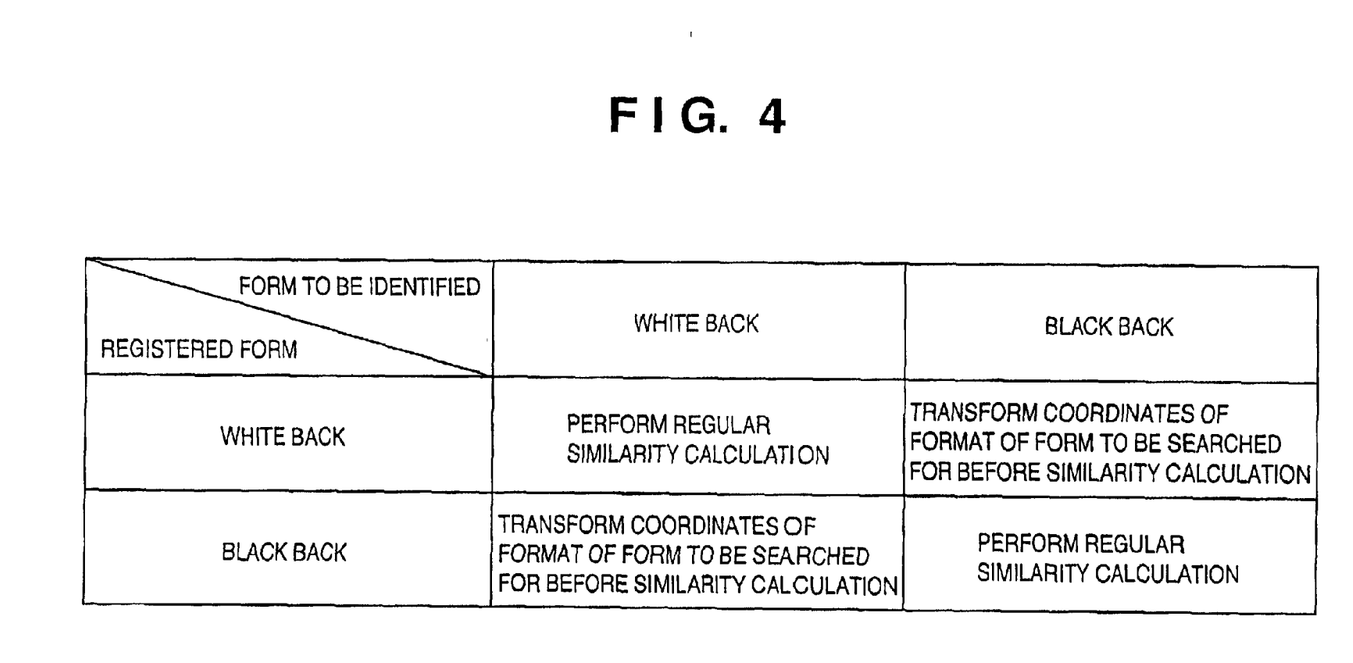
FIG. 4 shows a process performed by a combination of scanners in an environment where a black back scanner and white back scanner are used.

An issue in performing similarity calculation on the registered forms and the form to be identified regardless of the type of the scanner (white back or black back) will be clarified with reference to FIG. 4. If the form to be identified is one read by a white back scanner and the registered form is one read by a black back scanner, they are of different format data because their origin positions indicate mutually different points. Similarly, if the form to be identified is one read by a black back scanner and the registered form is one read by a white back scanner, their format data are mutually different. To solve this problem, the scanner is checked to see whether the type of scanners are different or not before performing the similarity calculation. This check will be described with reference to FIG. 6.

Figure 6:
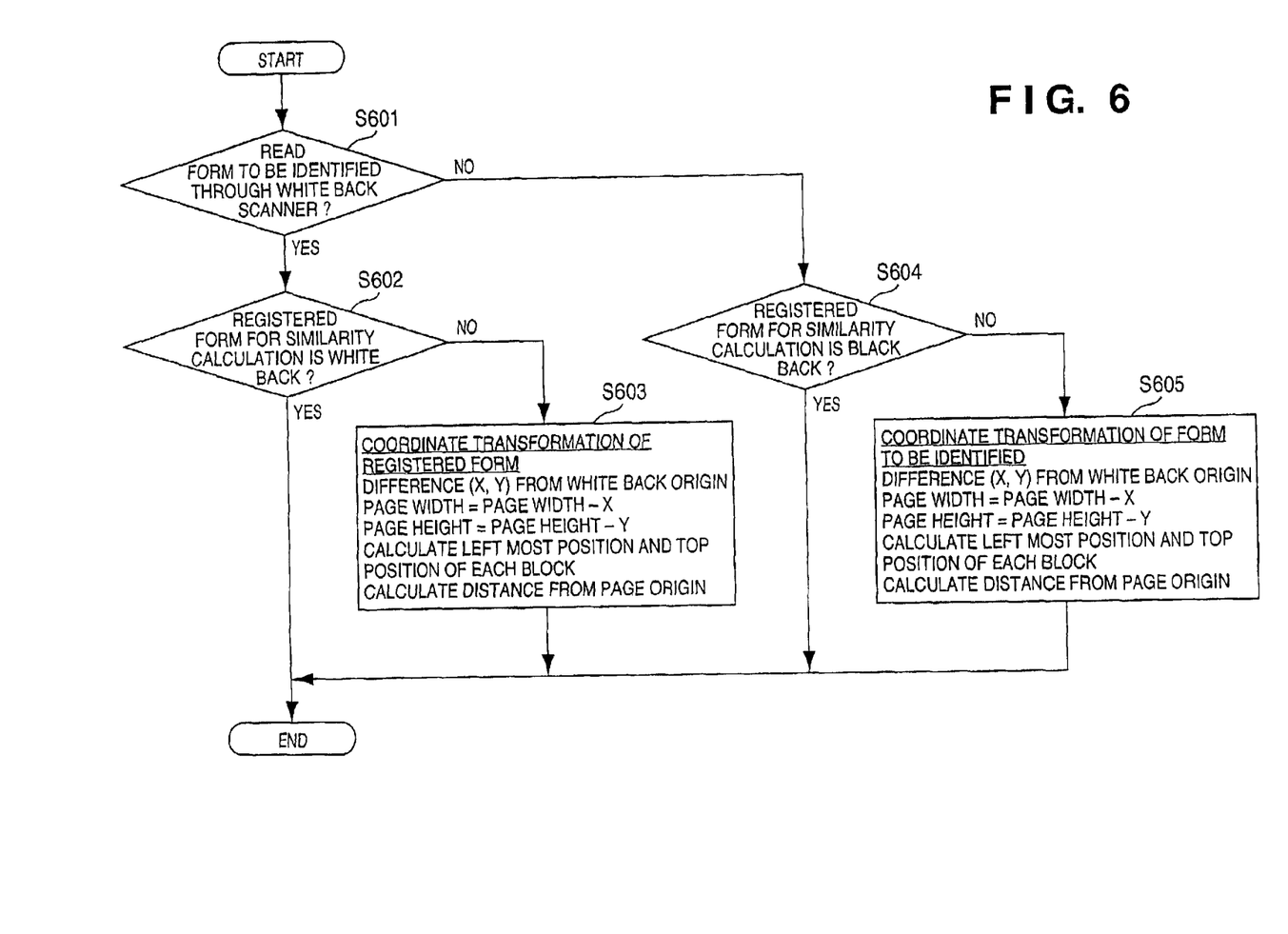
FIG. 6 is a flowchart of a similarity calculation process according to the present invention.

If the scanner used for reading the form to be identified is a white back scanner and the scanner used for reading the registered form is of a black back type, coordinate transformation is performed on the registered form (steps S601, S602, S603). As described earlier, the difference from the white back origin is contained in the header section 321a of the page format 321 for the registered form. The format data read by the black back scanner can be converted into format data that would be if it were read by the white back scanner, by subtracting the difference from the width and height of the form page, the left most and top positions of each block, and the distance from the page origin. By calculating the similarity between the converted format data and the format data of the form to be identified, a result equivalent to that of a regular similarity calculation can be obtained.

If the form to be identified is read by a black back scanner and the registered form is read by a white back scanner, a coordinate transformation is performed on the form to be identified (steps S601, S604, S605). The difference from the white back origin is contained in the header section 321a of the page format 321 for the form to be identified. The form to be identified can be converted into format data that would be if it were read by the white back scanner, in the same way described above and a result equivalent to that of a regular similarity calculation can be obtained.

As described above, a form can be identified regardless of whether it was read by a black back scanner or a white back scanner.

Therefore a user can use a form without concern for what kind of scanner was used to read the form in an environment where white back scanners and black back scanners are used.

Some forms are prone to have an error in their origin position because its white back origin is determined by using a table block or text block. According to the present invention, whenever a black back origin can be used, a form is identified by using the black back origin, therefore a form can be identified more accurately than form identification using only a white back origin.

[Other Embodiments]

While only the origin of a form has been considered in the foregoing description of the embodiment, the width and height of a form page can also be used as factors in the similarity calculation. In this case, the coordinates of the lower right corner of the form should also be defined. For a black back scanner, the coordinates of the lower right corner of an image are the coordinates of the lower right corner of the form because black rim correction is performed. For a white back scanner, the coordinates of the right most and bottom positions of a rectangle encompassing all blocks are determined as the coordinates of the lower right corner of the form. A difference (hereinafter called a "difference from the white back lower right coordinates") between the lower right corner coordinates (hereinafter called a "white back lower right coordinates") of a form read by a white back scanner and the lower right corner coordinates (hereinafter called a "black back lower right coordinates") of the form read by a black back scanner is stored beforehand in the header section 321a of a page format. In the form read by a white back scanner, the difference from the white back lower right coordinates is always zero.

One example of a method of recording the lower right coordinates in format data will be provided below. For a white back scanner, the right most position—the white back origin is recorded as the page width of the form and the bottom position—the white back origin is recorded as the page height of the form.

According to this embodiment, if a form to be identified is read by a black back scanner and a registered form is read by a white back scanner, the page width and height of the form read by the white back scanner can be obtained by subtracting a difference from the white back lower right corner coordinates from the lower right corner coordinates of the form to be identified in coordinate transformation, calculating the right most and bottom positions of a rectangle encompassing all blocks, and using these positions as format data to subtract the recorded white back origin position from the data.

While the format of a form is identified in the embodiments described above, the formats of other documents can also be identified.

The object of the present invention can also be attained by providing a storage medium containing a software program code for implementing functions of the embodiments described above to a system or an apparatus to cause a computer (or CPU or MPU) of the system or apparatus to read and execute the program code contained in the storage medium.

In such a case, the program code read from the storage medium implements the functions of the embodiments described above and the storage medium containing the program code constitutes the present invention.

The storage medium for providing the program code may be a floppy disk, hard disk, optical disk, magneto-optical disk, CD-ROM, CD-R, magnetic tape, nonvolatile memory card, or ROM.

The present invention also includes, besides the functions of the above-described embodiments being implemented by the computer executing the read program code, an implementation in which software such as an OS (operating system) running on the computer performs all or some of actual processing based on the instructions of the program code to implement the functions of the above-described embodiments.

The present invention also includes an implementation in which the program code read from the storage medium is loaded into memory provided in an expansion board inserted in the computer or in an expansion unit attached to the computer, then a component such as a CPU provided in the expansion board or the expansion unit performs all or some of actual processing based on the instructions of the program code to implement the functions of the above-described embodiments.

As many apparently widely different embodiments of the present invention can be made without departing from the spirit and scope thereof, it is to be understood that the invention is not limited to the specific embodiments thereof except as defined in the appended claims.

What is claimed is:

1. A computerized document format identification method, comprising the step of:
    extracting a feature from an image of a document read through an image input apparatus;
    generating, based on the feature extracted in said extraction step, document format data containing identification data for identifying a document format and correction information for indicating the type of image input apparatus used to read the document and correcting a feature difference produced by different types of image input apparatuses; and
    storing the document format data as registered document format data.

2. A document format identification method according to claim 1, further comprising the steps of:
    obtaining, by performing said extraction step and said generation step, second document format data for an image of a second document, the format of which is to be identified;
    comparing the second document format data to be identified with the registered document format data stored in said storage step;
    calculating a similarity between the registered document format data and the second document format data to be identified to identify the document format of the second document,
    wherein, when said comparison step compares the registered document format data stored in said storage step with the second document format data obtained in said obtaining step, said obtaining step includes determining based on the type of image input apparatus reading the second document whether the identification data stored in said storage step or the identification data generated in said generation step of identifying the second document format to be identified should be corrected based on the correction information for the document to be corrected, and if said obtaining step determines that correction is required, corrects the identification data of the document to be corrected based on the correction information for the document, and then compares the identification data stored in said storage step and identification data of the second document to calculate the similarity between the identification data of the documents.

3. A document format identification method according to claim 2, further comprising the step of using the results obtained in said calculation step to output identification codes and similarities of a predetermined number of document formats in descending order of similarity.

4. A document format identification method according to claim 2,
    wherein the correction information of the documents indicates a difference in origin position coordinates, the difference being caused because different types of image input apparatuses use different origin position extraction methods for feature extraction, and
    wherein said obtaining step performs coordinate transformation on the identification data stored in said storage step or the identification data of the second document by using the difference if said obtaining step determines that correction is required, then compares the identification data stored in said storage step and the identification data of the second document to calculate the similarity between the identification data of the documents.

5. A document format identification method according to claim 4, wherein the types of image input apparatuses include a black back scanner for reading a document image against a black background and a white back scanner for reading the document image against a white background,
    wherein said generation step for the documents sets the origin on a border between the background and the document and provides as the correction information a difference between point obtained based on a block area in the document and the origin if the document is read by a black back scanner, or sets the origin based on the block area in the document and provides the correction information without containing a difference if the document is read by a white back scanner; and
    wherein said obtaining step corrects the second document format data read by the black back scanner by using the correction information for the second document, then compares the registered document format data with the document format data of the second document to calculate a similarity between the document format data of the documents if the types of image input apparatuses do not match when comparing the registered document format data stored in said storage step with the second document format data.

6. A document format identification apparatus, comprising:
    extraction means for extracting a feature from an image of a document read through an image input apparatus;
    generation means for generating, based on the feature extracted by said extraction means, document format data containing identification data for identifying a document format and correction information for indicating a type of image input apparatus used to read the document and correcting a feature difference produced by different types of image input apparatuses; and storage means for storing the document format data as registered document format data.

7. A document format identification apparatus according to claim 6, further comprising:

identification means for obtaining, using said extraction means and said generation means, second document format data for an image of a second document, the format of which is to be identified;

comparison means for comparing the second document format data to be identified with the registered document format data stored in said storage means;

calculation means for calculating a similarity between the registered document format data and the second document format data to be identified to identify the document format of the second document, wherein, when said comparison means compares the registered document format data stored in said storage means with the second document format data obtained by said identification means, said identification means determines based on the type of image input apparatus reading the second document whether the identification data stored in said storage means or the identification data generated by said generation means for identifying the second document format to be identified should be corrected based on the correction information for the document to be corrected, and if said identification means determines that correction is required, corrects the identification data of the document to be corrected based on the correction information for the document, and then compares the identification data stored in said storage means an identification data of the second document to calculate the similarity between the identification data of the documents.

8. A document format identification apparatus according to claim 7, further comprising output means for using the results obtained from said calculation means to output identification codes and similarities of a predetermined number of document formats in descending order of similarity.

9. A document format identification apparatus according to claim 7, wherein:

the correction information of the documents indicates a difference in origin position coordinate, the difference being caused because different types of image input apparatuses use different origin position extraction methods for feature extraction, and said identification means performs coordinate transformation on the identification data stored in said storage means or the identification data of the second document by using the difference if said identification means determines that correction is required, then compares the identification data stored in said storage means and the identification data of the second document to calculate the similarity between the identification data of the documents.

10. A document format identification apparatus according to claim 9, wherein the types of image input apparatuses include a black back scanner for reading a document image against a black background and a white back scanner for reading the document image against a white background, wherein said generation means of the documents sets the origin on a border between the background and the document and provides as correction information a difference between a point obtained based on a block area in the document and the origin if the document is read by a black back scanner, or sets the origin based on the block area in the document and provides the correction information without containing difference if the document is read by a white back scanner; and wherein said identification means corrects the second document format data read by the black back scanner by using the correction information for the second document, then compares the registered document format data with the document format data of the second document to calculate a similarity between the document format data of the documents if the types of image input apparatuses do not match when comparing the registered document format data stored in said storage means with the second document format data.

11. A computer-readable storage medium storing a control program for causing a computer to implement a document format identification method, said program comprising:

code or extracting a feature from an image of a document read through an image input apparatus;

code or generating, based on the feature extracted by said code for an extraction step, document format data containing identification data for identifying a document format and correction information for indicating the type of image input apparatus used to read the document and correcting a feature difference produced by different types of image input apparatuses; and code for storing the document format data as registered document format data.

12. A document format identification method, comprising the steps of:

extracting a feature from an image of a document read through an image input apparatus, the format of which is to be identified;

generating, based on the feature extracted in said extraction step, document format data containing identification data for identifying a document format and correction information for indicating the type of image input apparatus used to read the document and correcting a feature difference produced by different types of image input apparatuses; and using document format data containing identification data about a plurality of documents for identifying data formats of the plurality of documents stored in storage means, and the correction information and the document format data generated in said generation step, identifying a document format of the document by comparing the document format data of the document with the document format data of the plurality of documents after correcting the identification data for the document based on the correction information, if the type of image input apparatus used for reading the document is different from the type of image input apparatus used for reading and identifying the data formats of the plurality of documents.

13. A document format identification method according to claim 12, wherein the types of image input apparatuses include a black back scanner for reading a document image against a black background and a white back scanner for reading the document image against a white background, wherein said generation step includes setting an origin in a predetermined position on a border between the background and the document and provides as the correction information a difference between a point determined based on the feature of the document and the origin if the document is read by a black back scanner, or sets as the origin a point determined based on the feature of the document if the document is read by a white back scanner, and wherein said identification step includes identifying the document format of the document by comparing the document format data stored in the storage means with the document format data of the document after correcting the document format data read by the black back scanner by using the correction information of the document if the types of image input apparatuses used for reading the document and the plurality of documents do not match.

14. A document format identification apparatus, comprising:

extraction means for extracting a feature from an image of a document read through an image input apparatus, the format of which is to be identified;

generation means for generating, based on the feature extracted by said extraction means, document format data containing identification data for identifying a document format and correction information for indicating a type of image input apparatus used to read the document and correcting a feature difference produced by a different types of image input apparatuses; and using document format data containing identification data about a plurality of documents for identifying data formats of the plurality of documents stored in storage means, and the correction information and the document format data generated by said generation means, identification means for identifying a document format of the document by comparing the document format data of the document with the document format data of the plurality of documents after correcting the identification data for the document based on the correction information, if the type of image input apparatus used for reading the document is different from the type of image input apparatus used for reading and identifying the data formats of the plurality of documents.

15. A document format identification apparatus according to claim 14, wherein the types of image input apparatuses include a black back scanner for reading a document image against a black background and a white back scanner for reading the document image against a white background, wherein said generation means sets an origin in a predetermined position on a border between the background and the document and provides as the correction information a difference between a point determined based on the feature of the document and the origin if the document is read by black back scanner, or sets as the origin a point determined based on the feature of the document if the document is read by a white back scanner, and wherein said identification means identifies the document format of the document by comparing the document format data stored in said storage means with the document format data of the document after correcting the document format data read by the black back scanner by using the correction information of the document if the types of image input apparatuses used for reading the document and the plurality of documents do not match.

16. A computer-readable storage medium storing a control program for causing a computer to implement a document format identification method, said program comprising:

code for extracting a feature from an image of a document read through an image input apparatus, the format of which is to be identified;

code for generating, based on the feature extracted by said code for said extraction step, document format data containing identification data for identifying a document format and correction information for indicating the type of the image input apparatus used to read the document and correcting a feature difference produced by different types of the image input apparatuses; and using document format data containing identification data about a plurality of documents for identifying data formats of the plurality of documents stored in storage means, and the correction information and the document format data generated by said code for a generation step, code for identifying a document format of the document by comparing the document format data of the document with the document format data of the plurality of documents after correcting the identification data for the document based on the correction information, if the type of image input apparatus used for reading the document is different from the type of image input apparatus used for reading and identifying the data formats of the plurality of documents.

* * * * *

UNITED STATES PATENT AND TRADEMARK OFFICE
CERTIFICATE OF CORRECTION

PATENT NO. : 6,968,501 B2 Page 1 of 1
APPLICATION NO. : 09/984119
DATED : November 22, 2005
INVENTOR(S) : Kenichi Kazumi It is certified that error appears in the above-identified patent and that said Letters Patent is hereby corrected as shown below:

[56] REFERENCES CITED

Other Publications
    In "Anonymous: ... etc.", "white" should read --White--; and "strips,'"' should read --Stripe,"--.

COLUMN 7

Line 47, "coordinate," should read --coordinates,--.

COLUMN 9

Line 26, "a" should be deleted.

Signed and Sealed this

Fourteenth Day of August, 2007

JON W. DUDAS
*Director of the United States Patent and Trademark Office*